US011956693B2

(12) United States Patent
Bhagat

(10) Patent No.: US 11,956,693 B2
(45) Date of Patent: Apr. 9, 2024

(54) APPARATUS AND METHOD FOR PROVIDING LOCATION

(71) Applicant: MITSUBISHI ELECTRIC CORPORATION, Tokyo (JP)

(72) Inventor: Akshay Bhagat, Canton, MI (US)

(73) Assignee: Mitsubishi Electric Corporation, Tokyo (JP)

( * ) Notice: Subject to any disclaimer, the term of this patent is extended or adjusted under 35 U.S.C. 154(b) by 709 days.

(21) Appl. No.: 17/110,977

(22) Filed: Dec. 3, 2020

(65) Prior Publication Data

US 2022/0182784 A1   Jun. 9, 2022

(51) Int. Cl.
*H04W 4/029* (2018.01)
*G01S 13/72* (2006.01)
*G01S 13/86* (2006.01)
*G01S 17/66* (2006.01)
*G01S 17/86* (2020.01)

(52) U.S. Cl.
CPC ............ *H04W 4/029* (2018.02); *G01S 13/723* (2013.01); *G01S 13/865* (2013.01); *G01S 13/867* (2013.01); *G01S 17/66* (2013.01); *G01S 17/86* (2020.01)

(58) Field of Classification Search
CPC ...... H04W 4/029; G01S 13/723; G01S 13/86; G01S 13/865; G01S 13/867; G01S 13/878; G01S 17/86; G01S 7/003; G01S 7/4802; G01S 2013/466; G01S 17/66
See application file for complete search history.

(56) References Cited

U.S. PATENT DOCUMENTS 6,574,548 B2 * 6/2003 DeKock ............ G08G 1/096758
340/901
6,771,208 B2 * 8/2004 Lutter .................... G01S 11/12
342/52

(Continued)

FOREIGN PATENT DOCUMENTS

JP   2003-065771 A   3/2003
JP   2003-149336 A   5/2003

(Continued)

OTHER PUBLICATIONS

Notice of Reasons for Refusal dated Sep. 27, 2022 from the Japanese Patent Office in Japanese Application No. 2020-214464.

(Continued)

*Primary Examiner* — Peter M Bythrow
(74) *Attorney, Agent, or Firm* — Sughrue Mion, PLLC; Richard C. Turner

(57) ABSTRACT

An apparatus for providing location information includes a plurality of sensor units which are distributed throughout a confined area lacking a global positioning system (GPS) coverage and have respectively a plurality of FOVs that at least partially overlap with each other in an overlap area, each of the plurality of sensor units including a first sensor and a second sensor of a type that is different from a type of the first sensor; and a processor. The processor is configured to fuse sensing data provided by the first sensor and the second sensor that are respectively included in each of the plurality of sensor units, identify a location of an object existing in the overlap area based on the fused sensing data, and provide location information of the identified location to the object.

24 Claims, 10 Drawing Sheets

(56) References Cited

U.S. PATENT DOCUMENTS

| | | | |
|---|---|---|---|
| 7,420,501 B2* | 9/2008 | Perl | G01S 13/91 342/36 |
| 7,460,951 B2* | 12/2008 | Altan | G06V 10/806 701/518 |
| 7,541,943 B2* | 6/2009 | Manor | G08G 1/01 340/522 |
| 9,472,097 B2* | 10/2016 | Stelzig | G08G 1/0133 |
| 10,140,855 B1* | 11/2018 | Swaminathan | G01S 13/91 |
| 10,405,146 B1 | 9/2019 | Kuruvilla et al. | |
| 2008/0094250 A1* | 4/2008 | Myr | G08G 1/081 340/909 |
| 2013/0151135 A1* | 6/2013 | Aubrey | G08G 1/0116 701/117 |
| 2013/0307981 A1* | 11/2013 | Jang | G08G 1/015 348/148 |
| 2014/0159925 A1* | 6/2014 | Mimeault | G01S 17/58 340/935 |
| 2014/0195138 A1* | 7/2014 | Stelzig | G08G 1/0116 701/119 |
| 2017/0090007 A1* | 3/2017 | Park | H04W 4/021 |
| 2019/0286923 A1* | 9/2019 | Wang | B60W 30/10 |
| 2019/0286924 A1* | 9/2019 | Fujita | G01S 13/865 |

FOREIGN PATENT DOCUMENTS

| | | |
|---|---|---|
| JP | 2016-17879 A | 2/2016 |
| JP | 2017-096813 A | 6/2017 |
| JP | WO2019/239471 A1 | 7/2020 |
| WO | 2018/105136 A1 | 6/2018 |

OTHER PUBLICATIONS

Office Action dated May 17, 2022 in Japanese Application No. 2020-214464.

* cited by examiner

APPARATUS AND METHOD FOR PROVIDING LOCATION

BACKGROUND

1. Field

The disclosure relates to an apparatus and a method for providing location information, and, more particularly, to providing location information in the areas where the Global Positioning System (GPS) service is unavailable or unreliable.

2. Description of Related Art

Nowadays, GPS is not readily available in many areas due to the lack of coverage and signal strength. Hence, it is difficult in those areas to identify locations of objects, such as vehicles and pedestrians, and provide accurate location of the objects.

Further, it is becoming popular to configure vehicles such that they have autonomous navigation capabilities. For example, drones and self-driving cars can be configured to autonomously navigate throughout an environment. These vehicles may need to rely on location data in navigating within the indoors environment.

For example, when an object is in the indoors parking lot or dense urban area, where there is no GPS is available or the GPS signal is weak or intermittent, it might be difficult to obtain accurate location of the object by using the related art methods.

SUMMARY

Embodiments provide an apparatus and a method for providing accurate location identification (ID) even in the areas where the GPS service is not available.

Embodiments may provide a method in which an accurate location that is up to a few centimeters accuracy even in indoor space may be obtained.

Additional aspects will be set forth in part in the description which follows and, in part, will be apparent from the description, or may be learned by practice of the presented embodiments.

In accordance with an aspect of the disclosure, an apparatus for providing location information includes: a plurality of sensor units which are distributed throughout a confined area lacking a GPS coverage and have respectively a plurality of fields of view (FOVs) that at least partially overlap with each other in an overlap area, each of the plurality of sensor units including a first sensor and a second sensor of a type that is different from a type of the first sensor; and a processor configured to fuse sensing data provided by the first sensor and the second sensor that are respectively included in each of the plurality of sensor units, identify a location of an object existing in the overlap area based on the fused sensing data, and provide location information of the identified location to the object.

In accordance with an aspect of the disclosure, a method for providing location information includes: obtaining sensing data from a plurality of sensor units which are distributed throughout a confined area which may be lacking a GPS coverage and have respectively a plurality of FOVs that at least partially overlap with each other in an overlap area, each of the plurality of sensor units including a first sensor and a second sensor of a type that is different from a type of the first sensor; fusing the sensing data provided by the first sensor and the second sensor that are respectively included in each of the plurality of sensor units; identifying a location of an object existing in the overlap area based on the fused sensing data; and providing location information of the identified location to the object.

In accordance with an aspect of the disclosure, there is provided a non-transitory computer-readable storage medium storing one or more instructions thereon which, when executed by at least one processor, cause the at least one processor to execute a method for providing location information, the method including: obtaining sensing data from a plurality of sensor units which are distributed throughout a confined area and have respectively a plurality of FOVs that at least partially overlap with each other in an overlap area, each of the plurality of sensor units including a first sensor and a second sensor of a type that is different from a type of the first sensor; fusing the sensing data provided by the first sensor and the second sensor that are respectively included in each of the plurality of sensor units; identifying a location of an object existing in the overlap area based on the fused sensing data; and providing location information of the identified location to the object.

BRIEF DESCRIPTION OF THE DRAWINGS

The above and/or other aspects, features, and advantages of certain embodiments of the present disclosure will be more apparent from the following description taken in conjunction with the accompanying drawings, in which.

DETAILED DESCRIPTION

Hereinafter, certain embodiments will be described with reference to the accompanying drawings.

Figure 1:
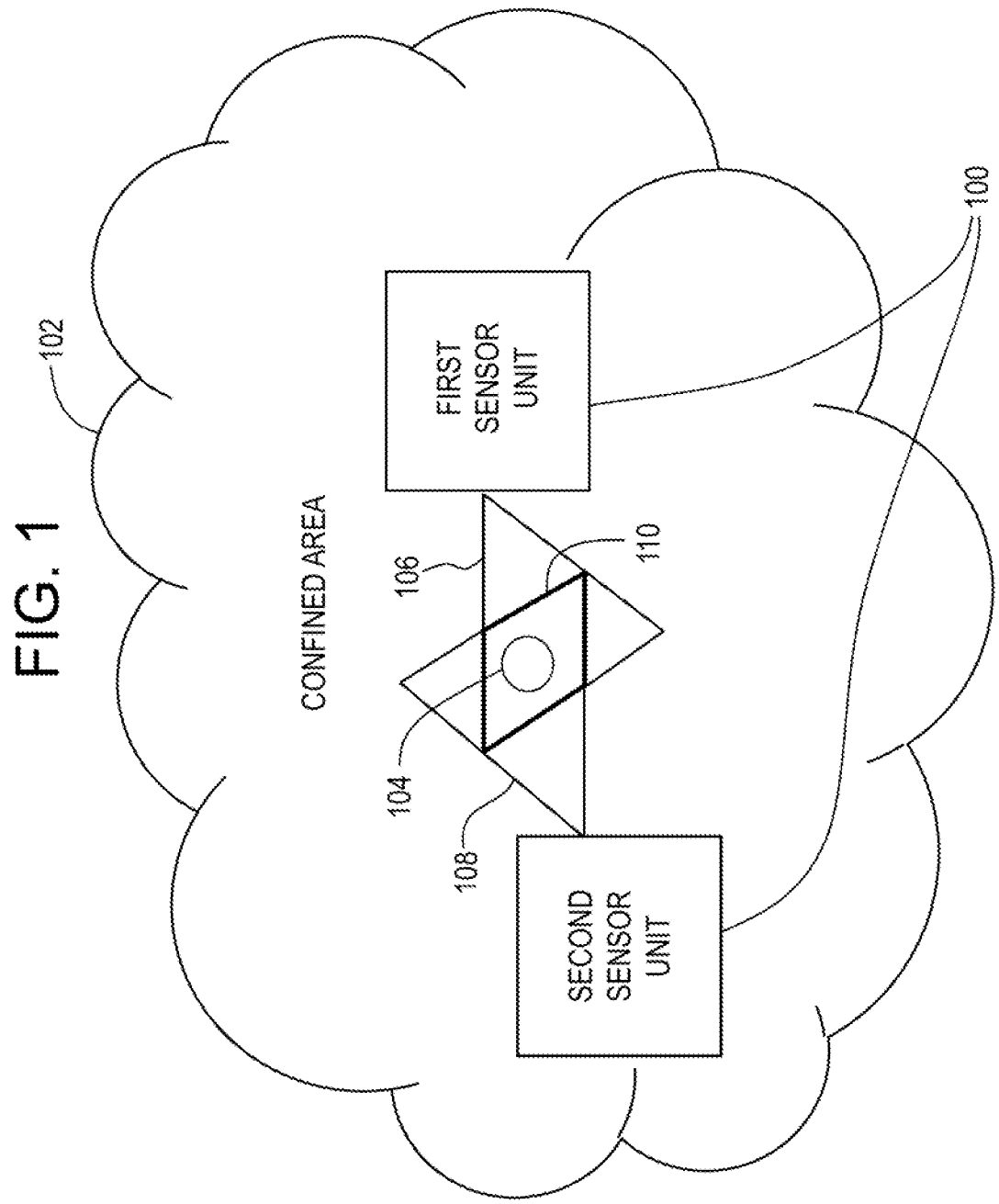
FIG. 1 is a diagram illustrating an operation of an apparatus for providing a location, according to an embodiment.

With reference to FIG. 1, a plurality of sensor units 100 may be distributed throughout a confined area 102 lacking a GPS coverage, according to an embodiment. For example, the GPS may be available in an area outside of the confined area 102. The confined area 102 may be an indoors parking lot, a multilevel parking garage, an intersection in the dense urban area, or any other area in which the GPS coverage may be unavailable. As another example, one or more objects 104 may be positioned in the confined area 102, while the plurality of sensor units 100 may be positioned outside the confined area 102, i.e., in the area in which the GPS service is available. An embodiment may also apply when the GPS service is intermittent such as in the dense urban areas where the GPS signal may be weak or the data transmission rates may be lagging.

The object 104 may be a target of tracking or may be associated with a target of tracking. E.g., the object may be a portable electronic device of a user or a computer of a vehicle or a robot. That is, the object 104 is a computing device accompanying the user or the motorized mechanical machine. In the case that the object 104 is the computing device accompanying the user, the user may be a subscriber to the non-GPS location providing service, thereby registering the associated computing device. In the case that the object 104 is the computing device of the motorized mechanical machine, the driver of the machine or the computing device of the machine may be a subscriber to the non-GPS location providing service.

The location delivered to the user is in augmentation to the actual GPS location received and hence no information is lost. The user subscribes to a location service which provides data as required.

Each of the plurality of sensor units 100 has an FOV 106, 108 that at least partially overlap with at least one other sensor unit of the plurality of sensor units 100 in an overlap area 110. With the configuration of an embodiment, the objects may be covered with at least two sensor units with overlapping FOVs along the moving path within a certain area. As such, the plurality of sensor units 100 cooperate to cover different FOVs for tracking the object 104.

For example, each two adjacent sensor units of the plurality of sensor units 100 that have overlapping FOVs may be grouped in pairs so that the sensor units of each of the pairs are different from the sensor units included in other pairs. However, this is not limiting, and the sensor units in some of the pairs may be also included in another pair. The pairs of the sensors units are distributed in the confined area so that the location of the object is tracked by the pairs and may be provided to the object. However, this is not limiting, and the plurality of sensor units 100 may be grouped in the groups of three sensor units having an overlapping FOV.

Each of the plurality of sensor units 100 has a predetermined location value which is accurate within 1 cm. The location of all of the detected objects may be determined through a sensor fusion method, e.g., an algorithm, that detects, classifies, and tracks the object along with its relative location. The local coordinates of the relative location are transformed into the global coordinates based on known coordinates of the plurality of sensor units 100. The tracking algorithm uses predefined motion models to estimate and/or predict the motion of the object 104 and update the location even in the case of occlusion.

Although the plurality of sensor units 100 is illustrated as having two sensor units, this is non-limiting and the plurality of sensor units 100 having the overlap area 110 may be, for example, three, for increased accuracy and faster delivery of the location to the user.

As described in detail below, the plurality of sensor units 100 may be connected to the cloud which may receive the combined information about the location of the nearby objects. The location may be delivered over wireless communication channels, e.g., 4G/5G, Wi-Fi, DSRC, etc., to the users of the location service. The object ID may be first established by the users themselves and/or may be done on the basis of the last known location, e.g., a location from which a last GPS signal was received. Final identification may be done through specific feedback signals provided by the object through the medium of detection of the various available sensors, e.g., by transmitting a visible or an invisible light, a ping, an ultrasound signal, a radio signal, an audio signal, etc. As another example, the feedback signal may be realized by one of time of flight (TOF) methods known in the art. Once the identification is verified via the feedback signal, the location may be delivered only to the computing device of the identified person or vehicle.

Figure 2:
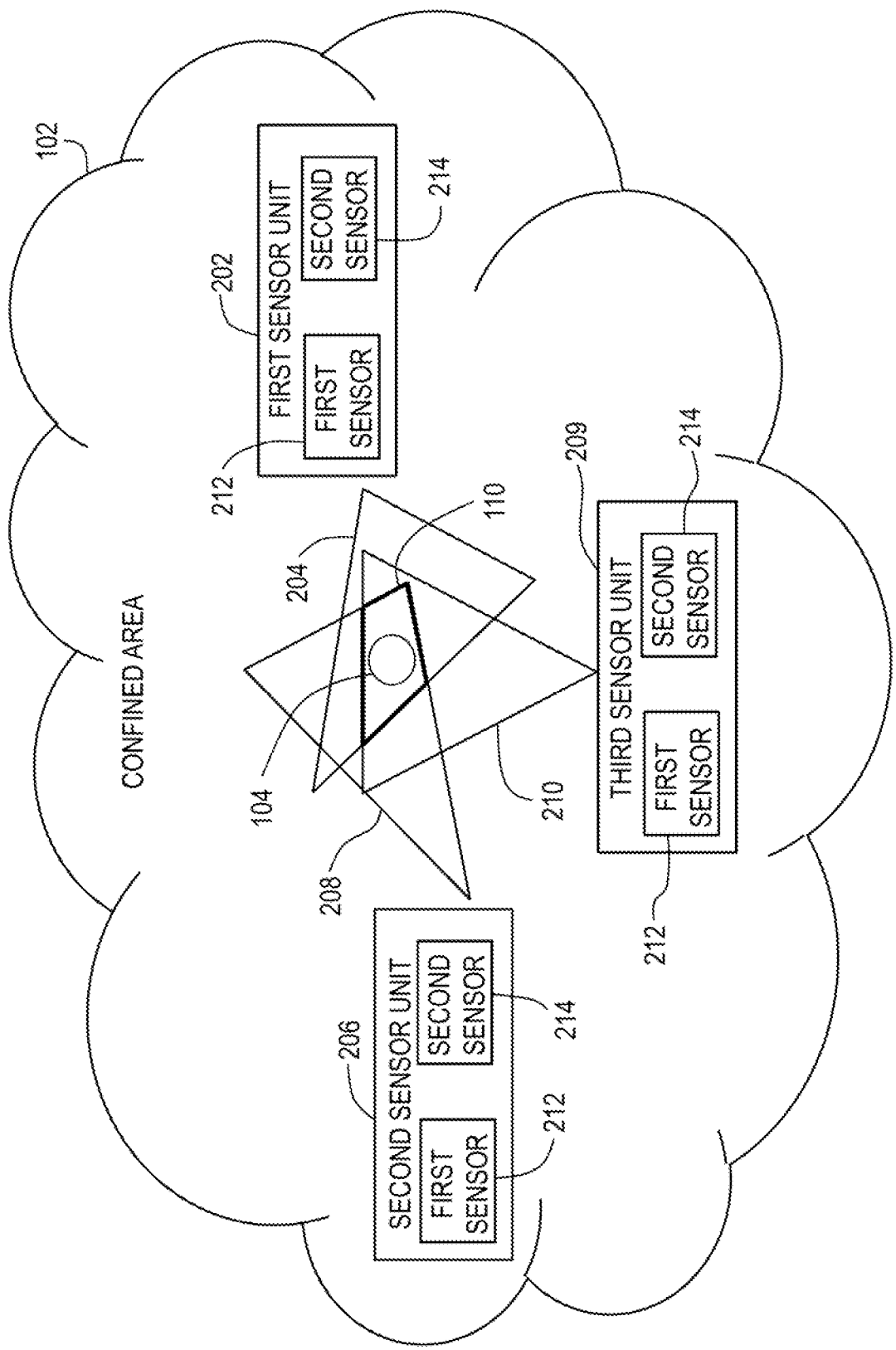
FIG. 2 is a diagram illustrating an operation of an apparatus for providing a location, according to an embodiment.

With reference to FIG. 2, the plurality of sensor units 100 may include a first sensor unit 202 having a first FOV 204, a second sensor unit 206 having a second FOV 208, and a third sensor unit 209 having a third FOV 210. The first FOV 204, the second FOV 208, and the third FOV 210 overlap in the overlap area 110. According to an embodiment, each of the plurality of sensor units 100 may include a first sensor 212 and a second sensor 214 of a type different from a type of the first sensor 212. However, this is not limiting and each of the plurality of sensor units 100 may additionally include a third sensor having a type different from that of the first sensor 212 and the second sensor 214.

Figure 3:
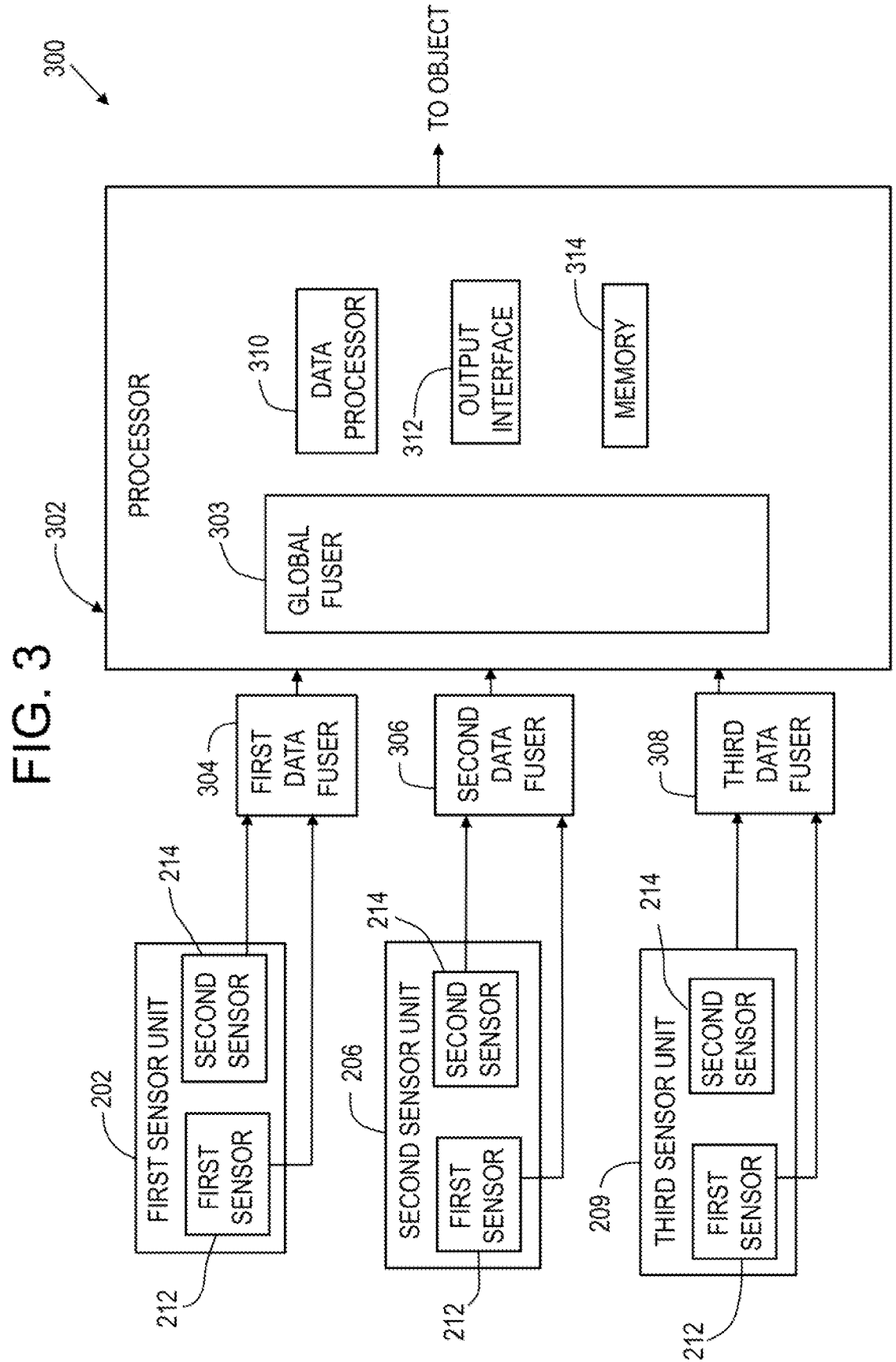
FIG. 3 is a block diagram illustrating an apparatus for providing a location, according to an embodiment.

With reference to FIG. 3, an apparatus 300 for providing a location of an object includes one or more processors 302 which may wirelessly receive sensing data from the plurality of sensor units 100 via a wireless interface provided in the processor 302. For example, the processor 302 may receive sensing data from at least two sensor units among the first sensor unit 202, the second sensor unit 206, and the third sensor unit 209. The sensing data may include data acquired by each of the plurality of sensor units 100 from its corresponding FOV, e.g., from at least two FOVs among the first FOV 204, the second FOV 208, and the third FOV 210. The sensing data may include sensing data of the overlap area 110 provided by the first sensor 212 and the second sensor 214, respectively, that are included in each of the plurality of sensor units 100. The processor 302 may include a global fuser 303 which may receive sensing data fused by a first fuser 304, a second fuser 306, and a third fuser 308 respectively receiving sensing data provided by the first sensor 212 and the second sensor 214 of each of the plurality of sensor units 100. A data processor 310 may process the fused sensing data and may identify a location of the object 104 based on the fused sensing data. However, this is not limiting and a single component, e.g., the global fuser 303 or the data processor 310 may fuse and process the sensing data. An output interface 312 may provide location information to the object wirelessly, e.g., via an Ethernet, Internet, etc.

In an embodiment, the output from different sensors is combined by integrating electrical and visual signals provided from the overlap area 110. By using the sensor fusion, a highly accurate localization may be achieved, to provide a fused location that is accurate to within few centimeters of an object and also the correct classification of the object, e.g., a person, a vehicle, a robot, etc., may be provided.

Although the individual fusers are shown as located outside of the plurality of sensor units 100, it is contemplated that all or some the first fuser 304, the second fuser 306, and the third fuser 308 may be integrated with the plurality of sensor units 100, respectively. In this case, since the data processing may be performed within the plurality of sensor units 100 and only the relevant fused sensing data are transmitted, the costs associated with the data processing and transmission may be further reduced.

For example, the processor 302 may be a server or a control center processing unit. In an embodiment, the processor 302 may be disposed on a cloud and be coupled to one or more memories 314, as known to those skilled in the art.

Figure 4:
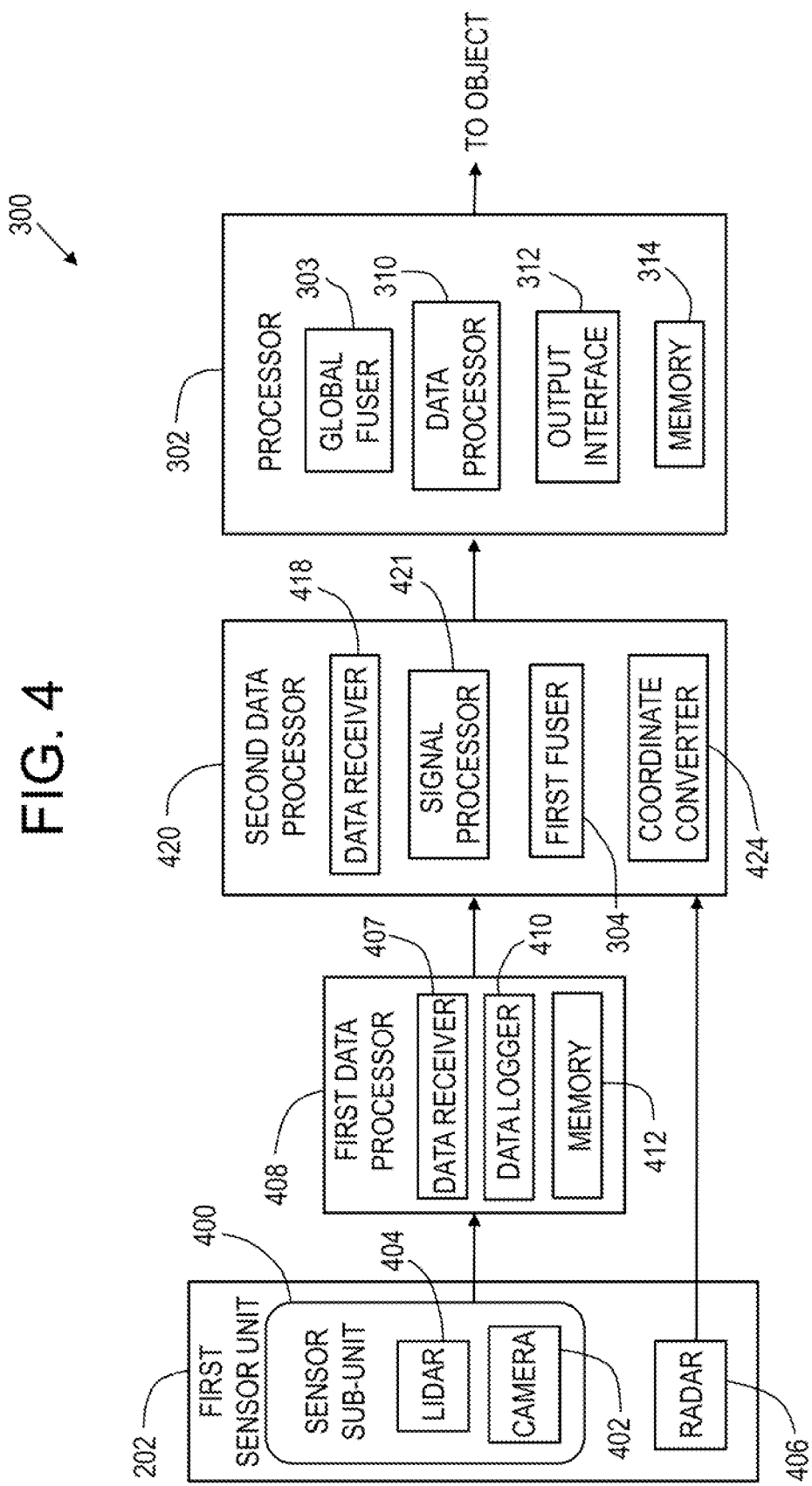
FIG. 4 is a block diagram illustrating an apparatus for providing a location, according to an embodiment.

With reference to FIG. 4, the first sensor unit 202 may include a sensor sub-unit 400 including a camera 402, e.g., an imaging sensor, and a light detection and ranging (lidar) sensor 404. The first sensor unit 202 may further include a radar 406. The camera 402 may correspond to the first sensor 212, the lidar sensor 404 may correspond to the second sensor 214, and the radar 406 may correspond to the third sensor mentioned above. Although only the first sensor unit 202 is illustrated in FIG. 4, an embodiment is applicable to the plurality of sensor units 100.

Image data from the camera 402 may be used in the identification of the object class or a type of the object, e.g., a car, a bus, a truck, a pedestrian, etc. Image data from the camera 402 may be also used to identify a two-dimensional (2D) bounding box around a location of the object in the image data. The 2D bounding box information may be then matched with the sensor fusion frame data of obstacles detected by lidar sensor and/or radar and then combined to determine the three-dimensional (3D) bounding box information which includes the estimated size (1*b*h) of the smallest cuboid which can completely cover the object, e.g., a vehicle, and its orientation with respect to the north-east axis.

The lidar sensor 404 may sense a shape of and distance to the object 104 by outputting a laser beam and receiving waveforms reflected from an object, thereby obtaining a shape or location of the object. In addition, the lidar sensor 404 may obtain information about a shape and location of the object 104 and a distance to the object 104 by using a time-of-flight scheme of measuring a distance to the object 104 based on a time of flight from a measurement point to the object 104, or a method of measuring a distance by performing triangulation using light. The lidar sensor 404 may include, but is not limited to, a multibeam lidar sensor, and a microelectromechanical systems (MEMS)/optical phased arrays (OPA) lidar sensor.

In an embodiment, the radar 406 may be used to detect accurate velocities of the object. The velocity is used to augment the tracking algorithm for better overall location accuracy. Location value from radar points are used in the local sensor fusion aspect but with a very high covariance signifying lower quality of detection by the radar.

In an embodiment, the plurality of sensor units 100 may be connected to Linux PC and a road side unit (RSU) PC via a communication interface according to a wireless communication method, e.g., via an Ethernet. For example, a data receiver 407 of a first data processor 408 receives the image data from the camera 402 and the raw data from the lidar sensor 404 data via the Ethernet. For example, the first data processor 408 may be a Linux PC running Ubuntu or any other appropriate computing device, e.g., a microprocessor.

The received image data from the camera 402 and/or the received raw data from the lidar sensor 404 may be logged by a data logger 410. For example, the received sensing data may be stored in one or more internal memories 412 or in an external memory or memories.

A data receiver 418 of a second data processor 420 may receive at least two among the sensing data acquired by the camera 402, the sensing data acquired by the lidar sensor 404, and the sensing data acquired by the radar 406. A signal processor 421 may process the received sensing data. The first fuser 304 may conduct the sensor fusion based on the acquired sensing data and may output the fused data. A coordinate converter 424 may convert coordinates of a position of the object 104 from the sensor local coordinate system to the global coordinate system by using, for example, a latitude and longitude conversion. For example, the second data processor 420 may be the RSU PC, for example, including an application specific (AP) processor, or may be any other appropriate computing device, e.g., a central processing unit (CPU), a microprocessor, etc.

The processor 302 may receive the detections provided by the second data processor 420 in global coordinate system. A global fuser 303 may conduct the global sensor fusion to obtain dynamic mapping. The global sensor fusion enables the combination of multiple fused detections from individual local sensing data fusers. This allows to accurately track the objects from the multiple directions and improve the accuracy.

Finally, the detection information of the object, e.g., the identification, position information, etc., may be output to the object 104, e.g., to a mobile phone of a user, a vehicle control system for controlling the vehicle, etc.

However, the described above is not limiting. For example, each of the first data processor 408, the second data processor 420, and the processor 302 may include fewer or greater number of components. Some components may be combined as one component or some components may be disposed separately. The first data processor 408 and the second data processor 420 may be embodied as a single entity and/or all or some of the components described with respect to the first data processor 408 and the second data processor 420 may be incorporated in the first sensor unit 202. As another example, the first data processor 408, the second data processor 420, and the processor 302 may be embodied as a single entity.

In an embodiment, in order to transfer larger bandwidth of raw data from lidar, radar and camera in real time with the lowest possible latency and stability, a data distribution service (DDS) may be used to transfer the sensing data between the sensor sub-unit 400 and the first data processor 408. DDS is a data transfer protocol which uses the data publisher to send out the raw data via DDS databus, and data subscriber to receive the data by the first data processor 408, e.g., the Linux PC. Compared to the traditional UDP/TCP communication method, the DDS showed faster data transfer, lower latency, and higher data integrity.

Figure 5:
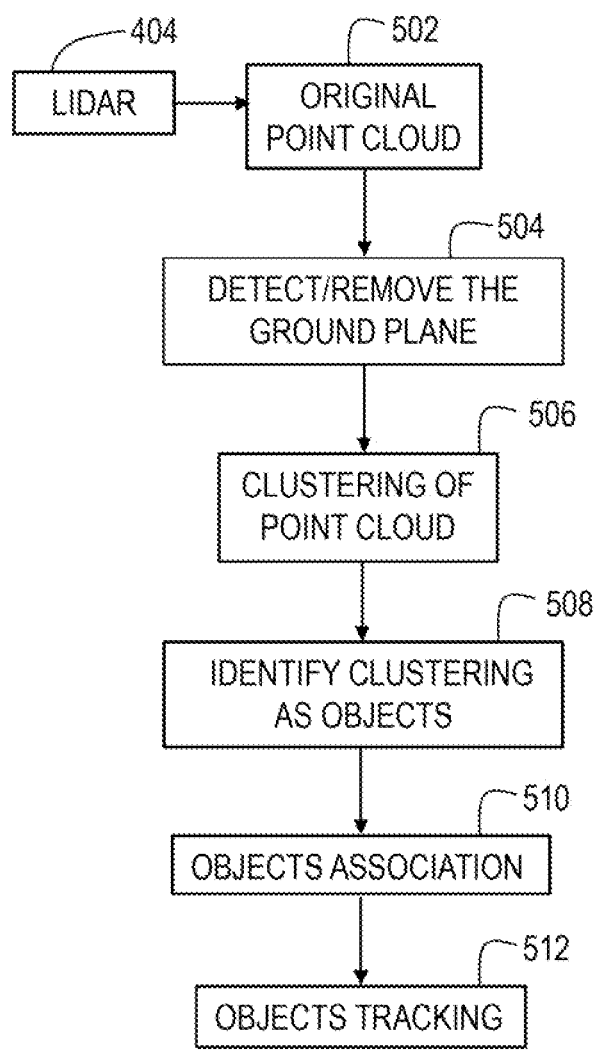
FIG. 5 is a block diagram illustrating a tracking method according to an embodiment.

With continuing reference to FIG. 4 and with further reference to FIG. 5, in operation 502, the raw data of the lidar sensor 404, i.e., Point Cloud, is received by the data receiver 407, logged by the data logger 410, and transferred via the DDS to the data receiver 418 and the signal processor 421. The signal processor 421 may execute the lidar signal processing algorithm.

Specifically, in operation 504, the ground plane of the Point Cloud may be identified and removed. The assumption is made of a horizontal placement of the lidar sensor 404 (or corrected accordingly) and that the curvature of the ground is minimal. Another assumption is made that at least some of the lidar points are from the ground plane relatively close to the lower end of the detection frame. The final labelling is done using a combination of range-based angular filter and polynomial fitting. Computational resources are saved by using breadth first search to mark the nearest similar neighboring points to each point labelled as the ground plane.

In operation 506, the object points, e.g., the ego-vehicle points, may be identified and clustering of Point Cloud may be performed. For example, multiple detections may belong to the same object, and in this case the multiple detections are clustered as an object based on common signal attributes.

In operation 508, the clustering may be identified as objects. In operation 510, the objects association may be performed. In operation 512, the tracking of the object 104 may be performed. That is, because the same object may remain in the overlap area 110 of the plurality of sensor units 100 for more than one detection cycle, the detection signals for the same object may be received and the same object may be tracked for at least two detection cycles. However, this is not limiting and the object may be tracked by existing in the first FOV 204 of only the first sensor unit 202.

The information on the object location and/or object tracking may be provided to the processor 302 which may report the information to the object 104. Although only one object is mentioned herein, an embodiment is applicable to a plurality of objects existing in the area in which the object monitoring and tracking is performed by using the plurality of sensor units 100.

Figure 6:
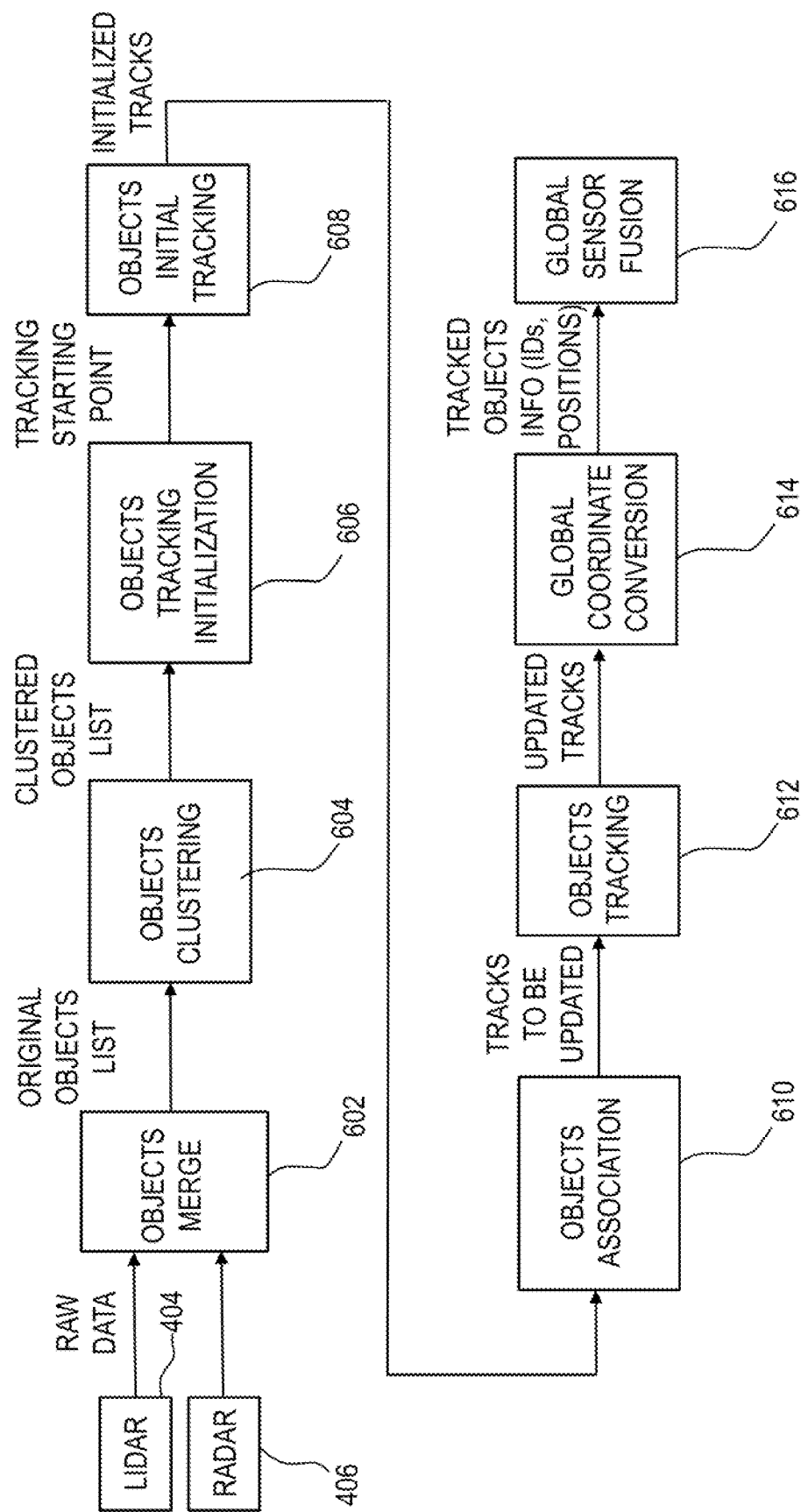
FIG. 6 is a block diagram illustrating a method of processing the sensing data according to an embodiment.

With continuing reference to FIG. 4 and with further reference to FIG. 6, the first fuser 304 may execute the sensor fusion method, e.g., an algorithm, to conduct the operations of objects merge from multiple sensors, e.g., the lidar sensor 404 and the radar 406; objects clustering; objects tracking initialization, e.g., Kalman filter initialization; objects initial tracking; objects association, e.g., by using Global Nearest Neighbor (GNN), etc.; and objects tracking. The tracked objects information, e.g., objects identifications, positions, etc., may be provided to the processor 302 and reported, via output interface 312, to the object(s) 104 based on the ID verification of each object.

Specifically, after the sensing data are received from the lidar sensor 404 and the radar 406 by the data receiver 418, the sensing data may be processed by the signal processor 421 as described above. That is, both the raw data of the lidar sensor 404 and the raw data of the radar 406 may be processed as described above with reference to FIG. 5. However, this is not limiting and the raw data of the lidar sensor 404 and/or the radar 406 may be processed in a different manner.

In operation 602, the objects merge may be performed. For example, the first fuser 304 receives the multiple detections from multiple sensors and puts all of detections in a list of detections that merges all individual object data based on sensor signal attributes. An original objects list may be output.

In operation 604, the objects clustering may be performed based on the original objects list. For example, multiple detections from multiple sensors may belong to the same object, and in this case the multiple detections are clustered as an object based on common signal attributes. A clustered objects list may be output.

In operation 606, based on the clustered objects, the first fuser 304 may initialize the tracking and output the tracking starting point. That is, because the same object may remain in the overlap area 110 of the plurality of sensor units 100 for more than one detection cycle, the detection signals for the same object may be received and the same object may be tracked for at least two detection cycles.

In operation 608, new measurements, e.g., detections, are associated to the existing tracking according to the association methods, e.g., GNN.

In operation 610, the objects association may be performed.

In operation 612, the first fuser 304 may conduct the tracking function after objects association by using Kalman filter and output updated tracking.

In operation 614, the coordinate converter 424 converts the local coordinates of the updated tracking point(s) to the global coordinates and provides the tracked objects identifications and positions to the processor 302 for global sensor fusion and tracking (operation 616).

Figure 7:
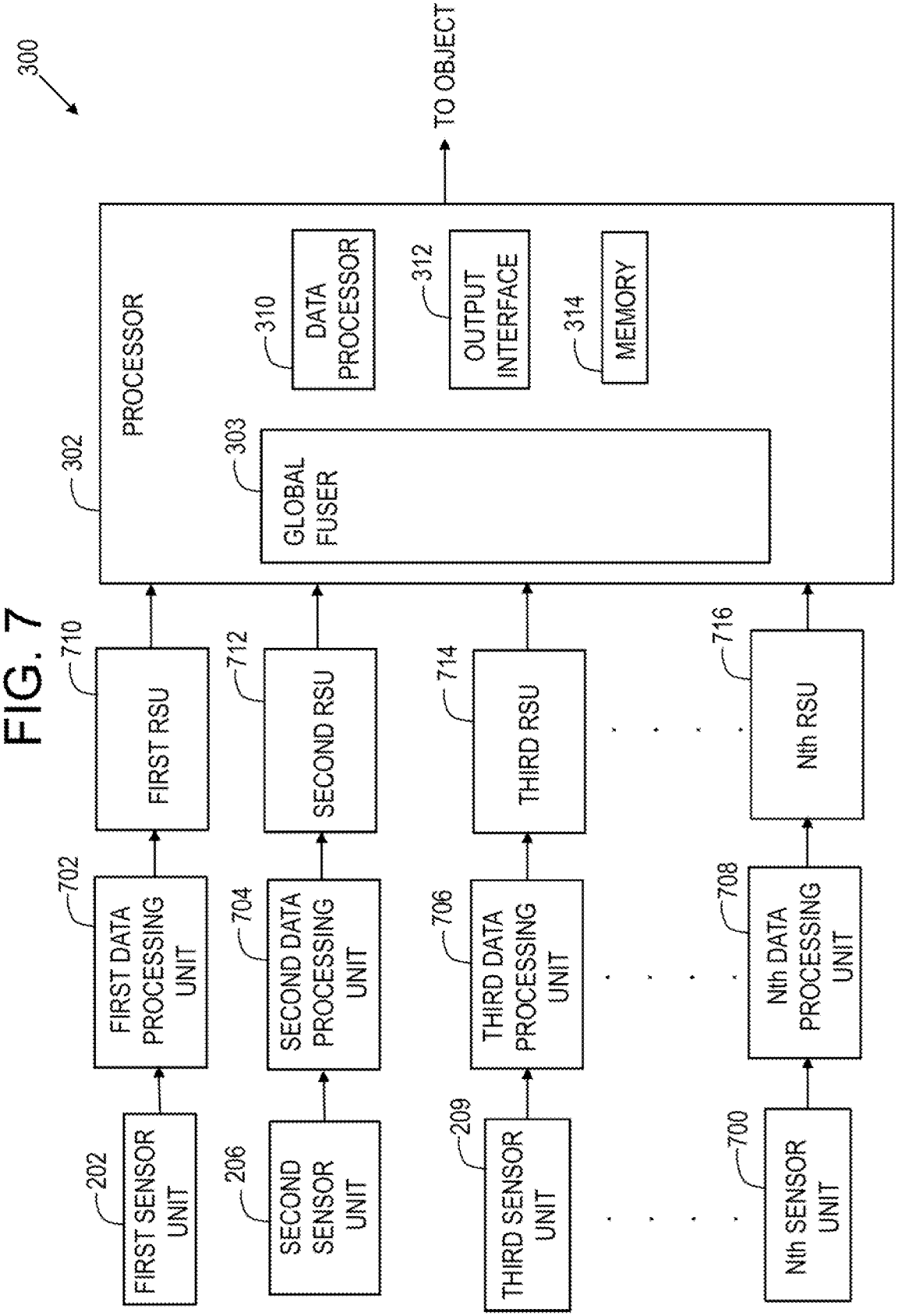
FIG. 7 is a block diagram illustrating an apparatus for providing a location, according to an embodiment.

With reference again to FIGS. 3 and 4 and further reference to FIG. 7, the processor 302 may perform the global sensor fusion (operation 616 of FIG. 6) by applying a global sensor fusion method, e.g., a global sensor fusion algorithm, to the sensing data provided by the plurality of sensor units 100 including the first sensor unit 202 to an Nth sensor unit 700. Each of the first sensor unit 202 to the Nth sensor unit 700 respectively provides the sensing data to a first data processing unit 702, a second data processing unit 704, and a third data processing unit 706 to an Nth data processing unit 708.

The first data processing unit 702 may correspond to the first data processor 408 of FIG. 4. Each of the second data processing unit 704 through the Nth data processing unit 708 may include the same components as the first data processor 408 and may perform the same operations, with respect to the sensing data provided by each of the second sensor unit 206 through the Nth sensor unit 700. I.e., embodiments described above with respect to the first data processor 408 are equally applicable to the first data processing unit 702 through the Nth data processing unit 708. A number of the first data processing unit 702 to the Nth data processing unit 708 may correspond to a number of the plurality of sensor units 100, or may be a different number. E.g., the output of few of the plurality of sensor units 100 may be processed by a single data processing unit.

The first RSU 710 may correspond to the second data processor 420 of FIG. 4. Each of a second RSU 712, and a third RSU 714 to an Nth RSU 716 may include the same components as the second data processor 420 and may perform the same operations, with respect to the data provided by each of the second data processing unit 704 through the Nth data processing unit 708. I.e., embodiments described above with respect to the second data processor 420 are equally applicable to the first RSU 710 through the Nth RSU 716. However, this is not limiting and the RSU 710 through the Nth RSU 716 may encompass the first data processing unit 702 to the Nth data processing unit 708, respectively.

A number of the first to Nth RSUs 710 to 714 may correspond to a number of the first data processing unit 702 through the Nth data processing unit 708, or may be a different number. E.g., the outputs of few among the first data processing unit 702 through the Nth data processing unit 708 may be processed by a single RSU. Although the first RSU 710 through the Nth RSU 716 are shown and described, an embodiment is not limited to the RSUs. For example, all or some of the first RSU 710 through the Nth RSU 716 may be substituted by one or more CPUs, etc.

After the sensing data are processed by the first RSU 710 to the Nth RSU 716, the sensing data may be transmitted to the processor 302 for global sensor fusion.

The global sensor fusion enables the combination of multiple fused detections from individual local sensing data fusers that are provided via the first RSU 710 through the Nth RSU 716. This allows to accurately track the objects from the multiple directions and improve the accuracy. Global sensor fusion receives high level characteristics of tracked objects so as to improve transmission rates and reduce computational complexity.

Figure 8:
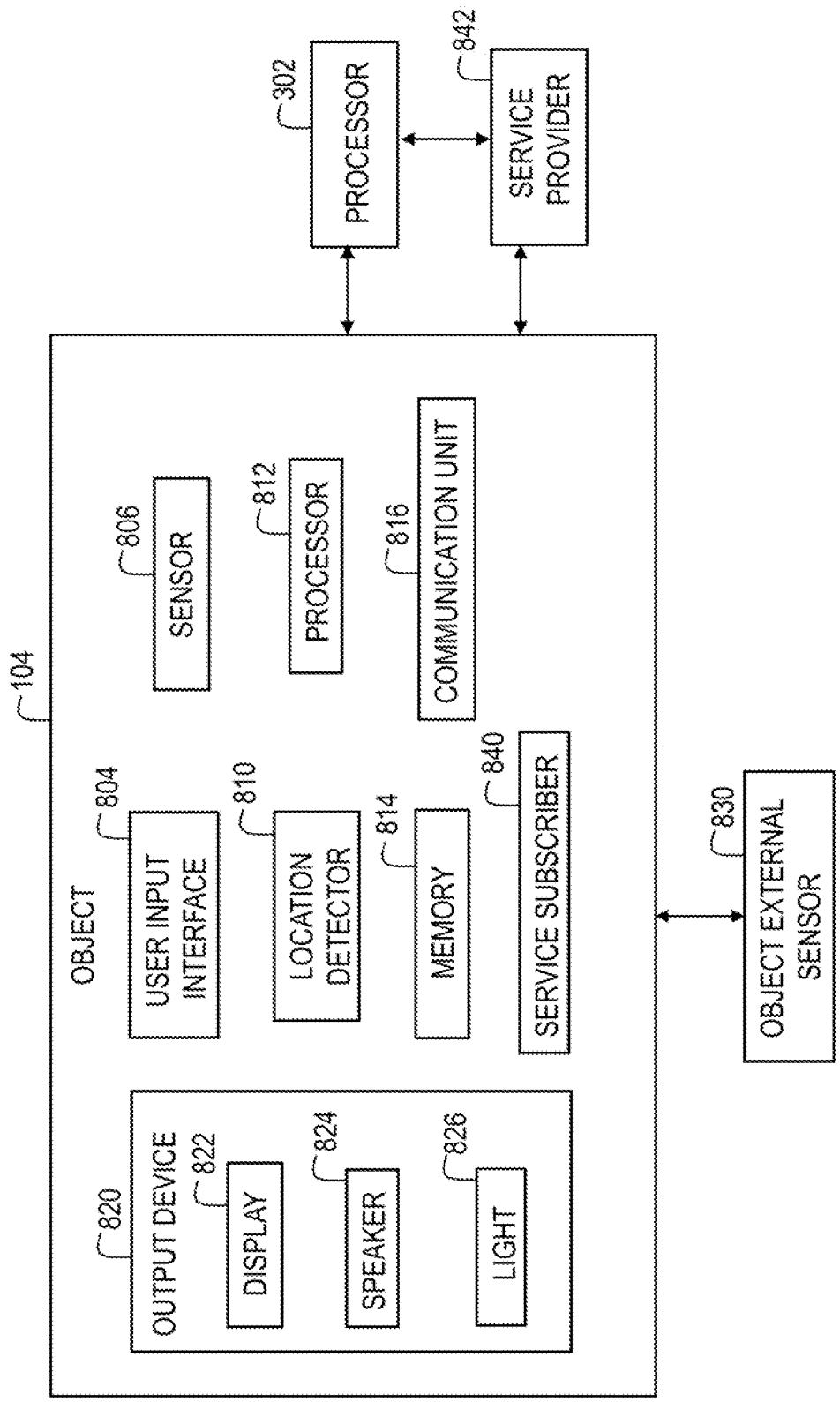
FIG. 8 is a block diagram illustrating an object communicating with a processor according to an embodiment.

FIG. 8 illustrates a block diagram of an example of the object 104, e.g., a user mobile device, for providing location information to the user, according to an embodiment. However, this is not limiting and the object may be a vehicle or a vehicle computer, a personal computer, a smart speaker, etc.

In an embodiment, the object 104 includes a user input interface 804, e.g., a graphical user interface (GUI), a button, a microphone, etc., a sensor 806, a location detector 810, one or more processors 812, a memory 814, a communication unit 816 (e.g., a communication processor and/or a communication interface), and an output device 820 including, for example, a display 822, a speaker 824, a light 826, etc. However, this is not limiting and the output device 820 may include more or less components. For example, the display 822 may include a touch screen and a touch pad. In this case, the user input interface 804 (i.e., a GUI) may be incorporated in the display 822. As another example, the display 822 may incorporate the function of the light 826.

For example, the object 104 may communicate with the processor 302 by providing its ID information, e.g., the object ID, may receive the location information and any other auxiliary information from the processor 302, based on the provided ID information, and control the display 822 to output the location information.

The object ID may be a user ID, e.g., a user name, password, user face recognition information, phone number, MAC number of the user device, etc., that is provided to the processor 302. For example, the object ID may be communicated via the speaker 824, the light 826, wireless communication, etc. For example, the light 826 of the object 104 may flash a light of a visible or invisible wavelength, a predetermined sequence of lights, or a predetermined sequence of color lights. In the case of the vehicle, a similar ID information may be provided by a headlight of the vehicle, an external camera, a vehicle sensor, via user's portable device through the windshield, etc. As another example, the object ID may be obtained by a camera included in one of the plurality of sensor units 100 in the vicinity of the object 104. e.g., as a facial identification, a license plate number, the object class, etc. In an embodiment, the object ID may be received by one of the plurality of sensor units 100 in the vicinity of the object 104 and may be communicated to the processor 302.

The processor 812 may receive the detection signals from the location detector 810 and/or one or more of object external sensors 830 and may determine that the user has entered the confined area 102. For example, the object external sensor 830 may be an external camera which is installed on an outside of the vehicle and captures image data of the surroundings of the vehicle, e.g., of an indoors garage. The processor 812 may be configured to provide the notification that the object 104 enters the confined area 102 to the processor 302, on display 822, and/or by an audio signal.

The sensor 806 may be configured to detect and/or identify the user environment, etc., and may include a device camera. The location detector 810 may be configured to detect the current location of the user as the context of the user. For example, the location detector 810 may be a sensor, e.g., a GPS, providing motion information related to the speed with which the object 104 is moving and location information in the area where the GPS service is available. Based on the motion information, the processor 812 may determine that the object 104 is nearing the confined area 102, for example, using known digital maps. In this case, the processor 812 may provide the last known object location to the processor 302. However, this is not limiting and the processor 302 may determine the last known object location based on the GPS signals.

The memory 814 may include one or more computer-readable storage media. The memory 814 may include non-volatile storage elements. Examples of the non-volatile storage elements may include magnetic hard discs, optical discs, floppy discs, flash memories, or forms of electrically programmable memories (EPROM) or electrically erasable and programmable (EEPROM) memories. The memory 814 may be incorporated into the processor 812, provided as a separate component of the object 104, or may be physically separated from the object 104.

The memory 814 may store a user history information and object information.

For example, a user, using the user input interface 804, may enter the ID information.

The communication unit 816 may be configured to communicate internally with the components of the object 104 and externally with networks and external devices.

The service subscriber 840 may facilitate communications with a service provider 842 of the location provider services, by communicating with the service provider 842 directly or through the processor 302.

In addition to the components shown in FIG. 8, the object 104 may include other components, e.g., other hardware or software components communicating with each other and/or external devices or entities. Likewise, the object 104 may include fewer components than illustrated.

Figure 9:
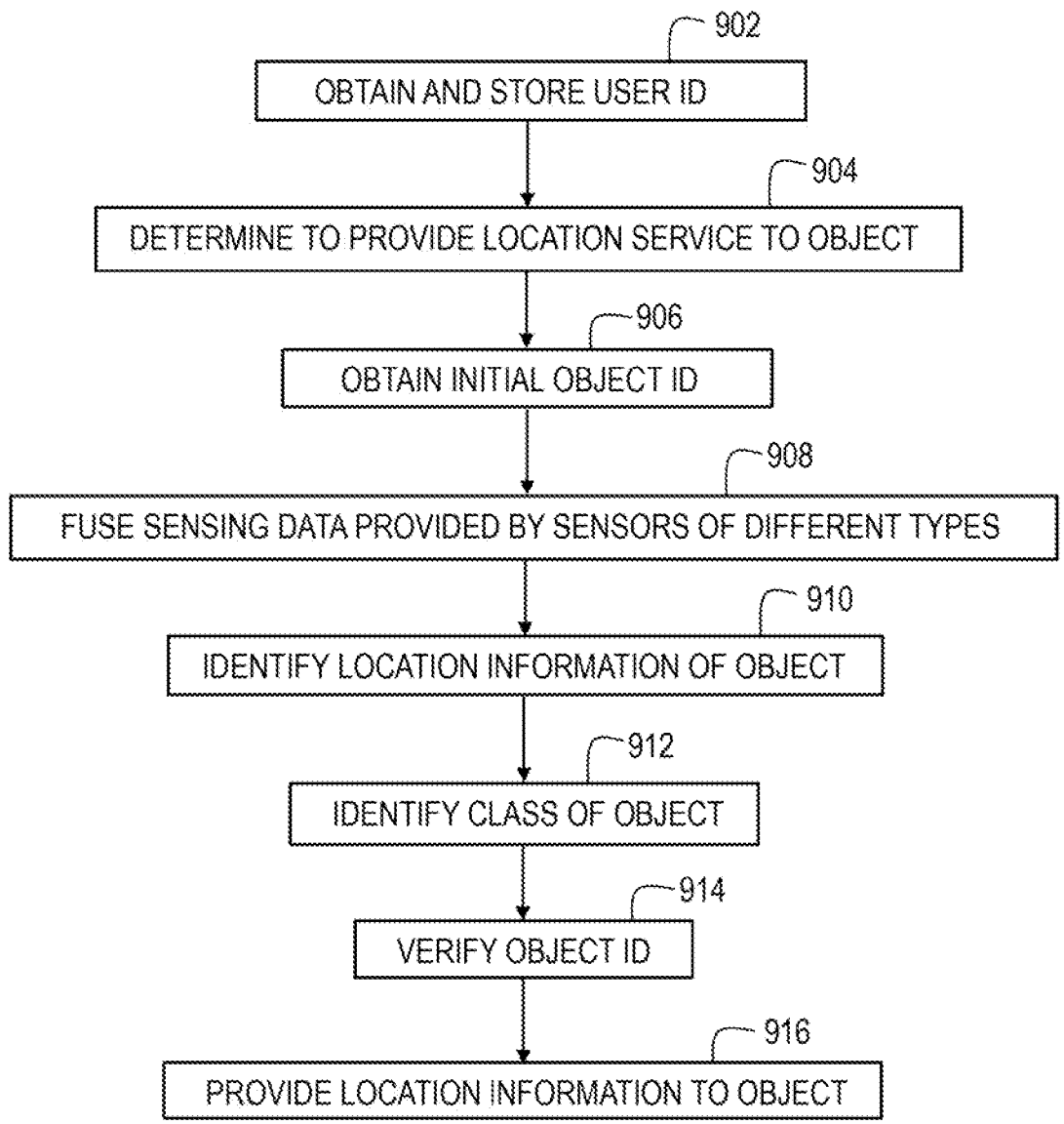
FIG. 9 is a flow diagram illustrating a method of providing location information according to an embodiment.

With continuing reference to FIG. 8 and further reference to FIG. 9, the processor 302 may obtain and store the object ID information of the object 104 (operation 902). For example, the processor 302 may obtain and store the object ID when a user of the object 104 signs up for the location providing service or the object ID maybe known to the processor as a priori based on the prior activities of a user of the object 104 or the object itself. The object ID may be, as described above, a name, a telephone number, a password, a pin, a signal sequence, etc.

In operation 904, the processor 302 may receive a notification to provide a location service to the object 104. For example, the notification may be received as a request provided by a user of the object 104, e.g., a user of a mobile device, a driver of a vehicle, etc., or may be received directly from a computing device of the object 104. As another example, the processor 302 may automatically determine that the object 104 has entered the confined area 102 based on the information provided by the processor 812 of the object 104.

In operation 906, the processor 302 may obtain real time confirmation of the object ID. For example, the processor 302 may send a request to the object 104 requesting the object 104 to identify itself. In this case, the message may be displayed on the display 822 and the user of the object 104 may provide the object ID, for example in the user input interface 804. As another example, when the object 104 is to provide the object ID when in the confined area, the processor 302 may send a request to the object 104 via a sensor of the plurality of sensor units 100 estimated being close to a location at which the object 104 is predicted to be. For example, the sensor may transmit a light signal, blink a light, display a message, or use an audio signal requesting the object 104 to provide the object ID. For example, when the object 104 enters the confined area 102, the motion of the object 104 may be detected, e.g., by a motion detector disposed at a boundary of the confined area 102. For example, a motion sensor used to track cars entering the indoors garage may be used. In response, the processor 302 may control an overhead display disposed at the entrance to the indoors area to display a message, e.g., "Please provide your ID." The object external sensor 830 may receive the message and the object 104 may provide its ID.

For example, the object 104 may provide the object ID by any method described above, e.g., flashing a predetermined sequence, flashing lights of a predetermined sequence of color lights, producing predetermined sounds, etc. For example, a headlight of the vehicle or a light of the portable device may be used. The processor 302 may control to start tracking the object from an initial tracking location from which the object ID is provided.

In operation 908, the processor 302 may fuse the data provided by the first to Nth RSUs 710 to 716 that collect and fuse the sensing data obtained by the plurality of sensor units 100 along the moving path of the object 104.

In operations 910 and 912, the processor 302 may identify the location of the object 104 and may identify the class of a subject associated with the object 104, e.g., a person carrying the portable electronic device, a vehicle, a robot, a pet carrying a smart device, etc. For example, the processor 302 may identify the sub-class of the person, e.g., a child, a man, a woman, a pedestrian, etc., based on contextual information. For example, the processor 302 may identify the sub-class of the vehicle, e.g., a sedan, a pickup truck, an SUV, a bus, etc. However, this is not limiting.

In an embodiment, based on the sensing data, the processor 302 may identify the locations and the classes of the objects and the users of the objects that exist in the surrounding of the object 104 that is being tracked. For example, if the object 104 is in a busy intersection, the processor 302 may identify the vehicles, pedestrians and their locations so that a warning signal to the object 104 may be provided if it is judged that the object 104 may be involved in an accident.

In operation 914, the processor 302 may verify the object ID, for example, by one of the methods described above, thereby receiving a feedback signal from the object 104, e.g., from autonomously moving mechanical object or from a user of the object.

In operation 916, the processor 302 may provide the location information to the 104 whose object ID is verified.

Figure 10:
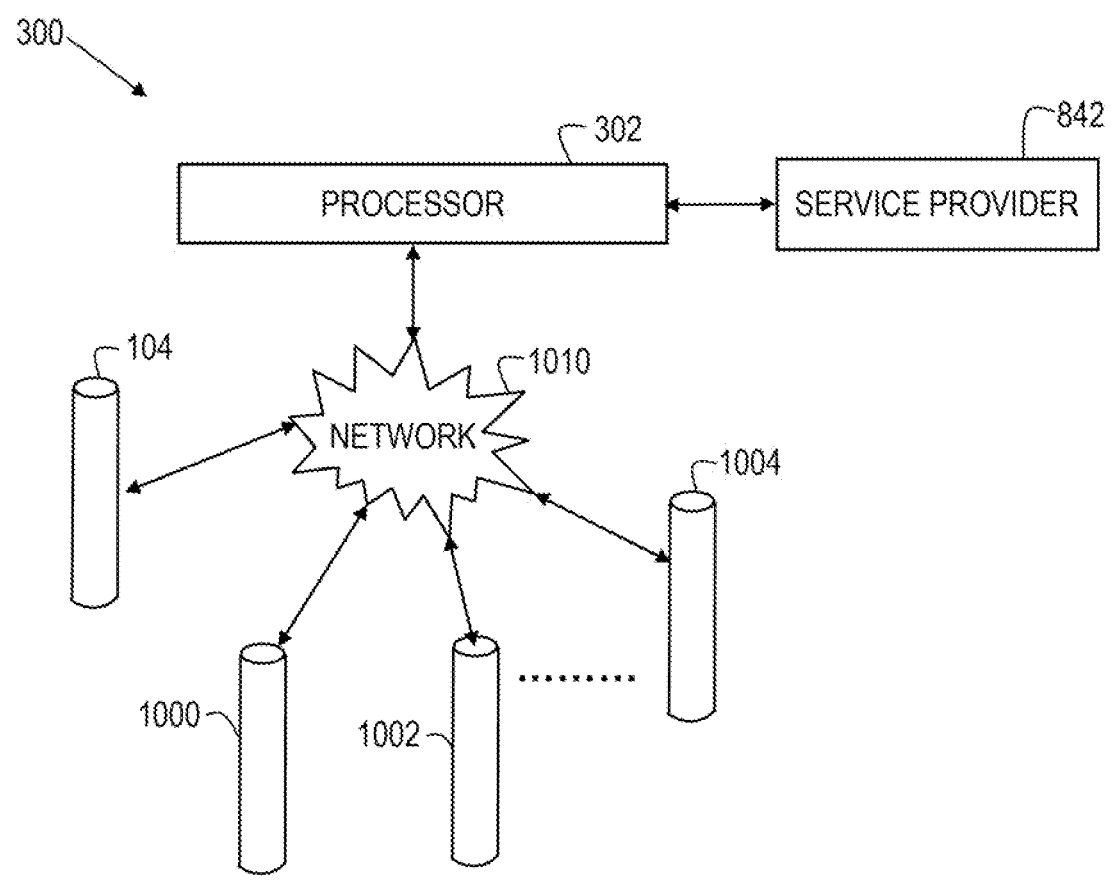
FIG. 10 is a diagram illustrating an apparatus for providing a location, according to an embodiment.

With reference to FIG. 10, a plurality of objects including objects 104, 1000 and 1002 through 1004 may be connected to the processor 302 via the network 1010 or via separate networks, according to an embodiment. In an embodiment, a number of the objects connectable to the processor 302 for obtaining a location service is not limited and may be 1, 2, 3, . . . , 100, . . . , 1000, etc.

The processor 302 may obtain the object ID information of each of the objects 104, 1000 and 1002 through 1004 when the objects sign up for the location providing service or in another manner. The object ID may be a name, a telephone number, a password, a pin, a signal sequence, etc.

The operation for providing the location services for the objects 1000 through 1004 by using the plurality of sensor units 100 is the same as is described above with respect to the object 104.

Embodiments may provide a cost-effective location providing service on the infrastructure end without the requirement of major investment in the specialized devices at the consumer end, in the areas where GPS is not available due to the lack of coverage or inadequate signal strength.

Embodiments may increase the accuracy of the related art GPS in the areas where GPS is available. While the related art GPS accuracy is within few meters, the localization accuracy in an embodiment is within few centimeters.

Embodiments may be variously applied for providing indoor localization by tracking the moving objects, for example, vehicles, people (e.g., in the mall, grocery stores, universities, hospitals) and even at home, e.g., for efficient management of children and/or pets.

According to embodiments, the localization may be achieved on a wider and more accurate scale for users where the GPS is not available at a low cost by augmentation of user maps in indoor and outdoor applications with the vehicles, pedestrians, and autonomous robots and/or vehicles.

Embodiments may be applicable to intersections to target a possible collision. For example, while pedestrians are walking, they may get in real time an accurate location on their phones and compare to the locations of other users and vehicles nearby to make sure that there is no impending accident. Similarly, when someone is driving through the intersection, the accurate locations may be provided, in real time, of all the pedestrians in the surrounding environment, thereby providing means for avoiding the potential collision.

Embodiments may provide location information as a service to the end user with the accuracy of few centimeters, by using fusion of sensing data provided by different sensor modalities while ensuring the detection and verification of the object identity, for example, by using the mobile phone flash light blink code, vehicle headlight blink code, and other similar user generated feedback mechanisms to be detected by the sensors including but not limited to lidar, radar, and camera described above.

A novel DDS protocol is used to transfer data between the source and the analysis module.

Embodiments described above may be implemented by a computer or an apparatus similar to a computer, by using software, hardware, or a combination thereof. In some cases, embodiments described herein may be implemented by one or more processors. According to implementation by software, processes and functions described herein may be implemented by separate software modules. Each of the software modules can perform one or more functions and operations described herein.

For example, embodiments may be implemented as software containing one or more instructions that are stored in machine-readable (e.g., computer-readable) storage medium (e.g., internal memory or external memory). A processor may call instructions from a storage medium and is operable in accordance with the called instructions. When the instruction is executed by a processor, the processor may perform the function corresponding to the instruction, either directly or under the control of the processor, using other components. The instructions may contain a code made by a compiler or a code executable by an interpreter. The machine-readable storage medium may be provided in the form of a non-transitory storage medium.

A non-transitory computer-readable storage medium refers to a medium that stores data semi-permanently, and is readable by machines, but not a medium that stores data for a short moment such as a register, a cache, and a memory. As examples of a non-transitory computer-readable medium, there may be a compact disc (CD), a digital video disc (DVD), a hard disc, a Blu-ray disc, a universal serial bus (USB), a memory card, a read only memory (ROM) and the like, but this is not limiting.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. An apparatus for providing location information, the apparatus comprising:
   a plurality of sensor units which are distributed throughout a confined area lacking a global positioning system (GPS) coverage and have respectively a plurality of field of views (FOVs) that at least partially overlap with each other in an overlap area, each of the plurality of sensor units comprising a first sensor and a second sensor of a type that is different from a type of the first sensor; and a processor configured to:

fuse sensing data provided by the first sensor and the second sensor that are respectively included in each of the plurality of sensor units, identify a location of an object existing in the overlap area based on the fused sensing data, and provide location information of the identified location to the object.

2. The apparatus of claim 1, wherein the processor is further configured to:

obtain object identification (ID) of the object that is associated with a location service, track the location of the object based on the object ID and the fused sensing data, prior to the providing the location information to the object, verify the object ID based on a signal provided by the object, and provide the location information to the object whose object ID has been verified, wherein the object comprises one of a motorized machine or a portable electronic device, the signal comprises at least one of: i) a ping, ii) a light of a visible or an invisible wavelength, iii) a sound signal, iv) an ultrasound signal, or v) a radio signal that is transmitted by the one of the motorized machine or the portable electronic device, respectively, and wherein the signal is a feedback signal provided by the object, and the feedback signal is configured to complete the object identification.

3. The apparatus of claim 1, wherein the processor is further configured to:

obtain an initial tracking location of the object based on at least one of a signal identifying the object that is received from the object or a last GPS signal obtained from the object prior to the object entering the confined area, and track the location of the object from the initial tracking location, wherein the object comprises one of a motorized machine or a portable electronic device, and the signal comprises at least one of a ping or a light of a visible or an invisible wavelength that is transmitted from the at least one of the motorized machine or the portable electronic device, respectively.

4. The apparatus of claim 1, wherein each two adjacent sensor units of the plurality of sensor units that have overlapping FOVs are grouped in pairs so that sensor units of each of the pairs are different from sensor units included in other pairs, and the pairs are distributed in the confined area so that the location of the object is tracked by the pairs and provided to the object.

5. The apparatus of claim 1, wherein the first sensor is a light detection and ranging (lidar) sensor, the second sensor is an imaging sensor whose image data are fused with the sensing data of the lidar sensor for each of the plurality of sensor units, and the processor is further configured to:

identify a class of the object as one of a person carrying a portable electronic device, a vehicle, or a robot, based on at least one of the image data or the fused sensing data.

6. The apparatus of claim 1, wherein each of the plurality of sensor units further comprises a third sensor, the first sensor is a light detection and ranging (lidar) sensor, the second sensor is an imaging sensor, the third sensor is a radar, and the processor is further configured to:

combine the sensing data provided by the lidar sensor and sensing data provided by the radar for each of the plurality of sensor units, fuse image data provided by the imaging sensor of each of the plurality of sensor units with the combined sensing data, respectively, and identify a class of the object as one of a person carrying a portable electronic device, a vehicle, or a robot, based on at least one of the image data or the fused sensing data.

7. A method for providing location information, the method comprising:

obtaining sensing data from a plurality of sensor units which are distributed throughout a confined area lacking a global positioning system (GPS) coverage and have respectively a plurality of field of views (FOVs) that at least partially overlap with each other in an overlap area, each of the plurality of sensor units including a first sensor and a second sensor of a type that is different from a type of the first sensor;

fusing the sensing data provided by the first sensor and the second sensor that are respectively included in each of the plurality of sensor units;

identifying a location of an object existing in the overlap area based on the fused sensing data; and providing location information of the identified location to the object.

8. The method of claim 7, wherein the identifying the location further comprises:

obtaining object identification (ID) of the object that is associated with a location service; and tracking the location of the object based on the object ID and the fused sensing data.

9. The method of claim 8, wherein the providing the location information further comprises:

prior to the providing the location information to the object, verifying the object ID based on a signal provided by the object; and providing the location information to the object whose object ID has been verified, wherein the object comprises one of a motorized machine or a portable electronic device, the signal comprises at least one of: i) a ping, ii) a light of a visible or an invisible wavelength, iii) a sound signal, iv) an ultrasound signal, or v) a radio signal that is transmitted by the one of the motorized machine or the portable electronic device, respectively, and wherein the signal is a feedback signal provided by the object, and the feedback signal is configured to complete the object identification.

10. The method of claim 7, wherein the identifying the location further comprises:

obtaining an initial tracking location of the object based on at least one of a signal identifying the object that is received from the object or a last GPS signal obtained from the object prior to the object entering the confined area, and tracking the location of the object from the initial tracking location, wherein the object includes one of a motorized machine or a portable electronic device, and the signal comprises at least one of a ping or a light of a visible or an invisible wavelength that is transmitted from the at least one of the motorized machine or the portable electronic device, respectively.

11. The method of claim 7, wherein each two adjacent sensor units of the plurality of sensor units that have overlapping FOVs are grouped in pairs so that sensor units of each of the pairs are different from sensor units included in other pairs, the pairs are distributed in the confined area, and the providing the location information further comprises:

tracking the location of the object along a moving path of the object by the pairs; and providing the location of the object that is tracked by the pairs.

12. The method of claim 7, wherein the first sensor is a light detection and ranging (lidar) sensor, the second sensor is an imaging sensor whose image data are fused with the sensing data of the lidar sensor for each of the plurality of sensor units, and the method further comprises identifying a class of the object as one of a person carrying a portable electronic device, a vehicle, or a robot, based on at least one of the image data or the fused sensing data.

13. The method of claim 7, wherein each of the plurality of sensor units further includes a third sensor, the first sensor is a light detection and ranging (lidar) sensor, the second sensor is an imaging sensor, and the third sensor is a radar, and wherein the fusing further comprises:

combining the sensing data provided by the lidar sensor and sensing data provided by the radar for each of the plurality of sensor units; and fusing image data provided by the imaging sensor of each of the plurality of sensor units with the combined sensing data, respectively, and wherein the identifying the location further comprises identifying a class of the object as one of a person carrying a portable electronic device, a vehicle, or a robot, based on at least one of the image data or the fused sensing data.

14. A non-transitory computer-readable storage medium storing one or more instructions thereon which, when executed by at least one processor, cause the at least one processor to execute a method for providing location information, the method including:

obtaining sensing data from a plurality of sensor units which are distributed throughout a confined area lacking a global positioning system (GPS) coverage and have respectively a plurality of field of views (FOVs) that at least partially overlap with each other in an overlap area, each of the plurality of sensor units including a first sensor and a second sensor of a type that is different from a type of the first sensor;

fusing the sensing data provided by the first sensor and the second sensor that are respectively included in each of the plurality of sensor units;

identifying a location of an object existing in the overlap area based on the fused sensing data; and providing location information of the identified location to the object.

15. The non-transitory computer-readable storage medium of claim 14, wherein the identifying the location further includes:

obtaining object identification (ID) of the object that is associated with a location service; and tracking the location of the object based on the object ID and the fused sensing data.

16. The non-transitory computer-readable storage medium of claim 15, wherein the providing the location information further includes:

prior to the providing the location information to the object, verifying the object ID based on a signal provided by the object; and providing the location information to the object whose object ID has been verified, wherein the object comprises one of a motorized machine or a portable electronic device, the signal comprises at least one of: i) a ping, ii) a light of a visible or an invisible wavelength, iii) a sound signal, iv) an ultrasound signal, or v) a radio signal that is transmitted by the one of the motorized machine or the portable electronic device, respectively, and wherein the signal is a feedback signal provided by the object, and the feedback signal is configured to complete the object identification.

17. The non-transitory computer-readable storage medium of claim 14, wherein the identifying the location further includes:

obtaining an initial tracking location of the object based on at least one of a signal identifying the object that is received from the object or a last GPS signal obtained from the object prior to the object entering the confined area, and tracking the location of the object from the initial tracking location, wherein the object includes one of a motorized machine or a portable electronic device, and the signal comprises at least one of a ping or a light of a visible or an invisible wavelength that is transmitted from the at least one of the motorized machine or the portable electronic device, respectively.

18. The non-transitory computer-readable storage medium of claim 14, wherein each two adjacent sensor units of the plurality of sensor units that have overlapping FOVs are grouped in pairs so that sensor units of each of the pairs are different from sensor units included in other pairs, the pairs are distributed in the confined area, and the providing the location information further includes:

tracking the location of the object along a moving path of the object by the pairs; and providing the location of the object that is tracked by the pairs.

19. The non-transitory computer-readable storage medium of claim 14, wherein the first sensor is a light detection and ranging (lidar) sensor, the second sensor is an imaging sensor whose image data are fused with the sensing data of the lidar sensor for each of the plurality of sensor units, and the method further includes identifying a class of a subject associated with the object as one of a person, a vehicle, or a robot, based on at least one of the image data or the fused sensing data.

20. The non-transitory computer-readable storage medium of claim 14, wherein each of the plurality of sensor units further includes a third sensor, the first sensor is a light detection and ranging (lidar) sensor, the second sensor is an imaging sensor, and the third sensor is a radar, and wherein the fusing further includes:

combining the sensing data provided by the lidar sensor and sensing data provided by the radar for each of the plurality of sensor units; and fusing image data provided by the imaging sensor of each of the plurality of sensor units with the combined sensing data, respectively, and wherein the identifying the location further includes identifying a class of a subject associated with the object as one of a person, a vehicle, or a robot, based on at least one of the image data or the fused sensing data.

21. The apparatus of claim 2, wherein the signal provided by the object is the sound signal or the ultrasound signal.

22. The apparatus of claim 1, wherein the object is a mobile phone.

23. The apparatus of claim 22, wherein the mobile phone is in the confined area at a second time, the mobile phone is equipped with a GPS sensor configured to receive GPS signals and estimate, at a first time before the second time when the object is not in the confined area, a first location based on the GPS signals, and the processor is further configured to provide the first location to the mobile phone.

24. The apparatus of claim 23, wherein a user of the mobile phone is a pedestrian, and the apparatus is configured to warn the pedestrian, based on the location reported to the mobile phone, of an impending collision.

\* \* \* \* \*